March 14, 1944.  N. ZWALD  2,344,339
AUTOMOBILE WINDOW SUPPORTED HAT RACK AND COAT HANGER DEVICE
Filed Feb. 28, 1940
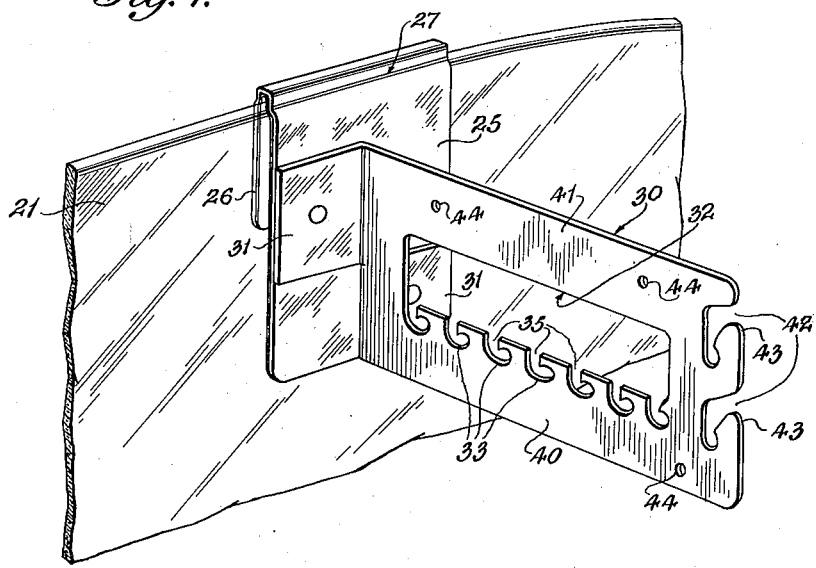
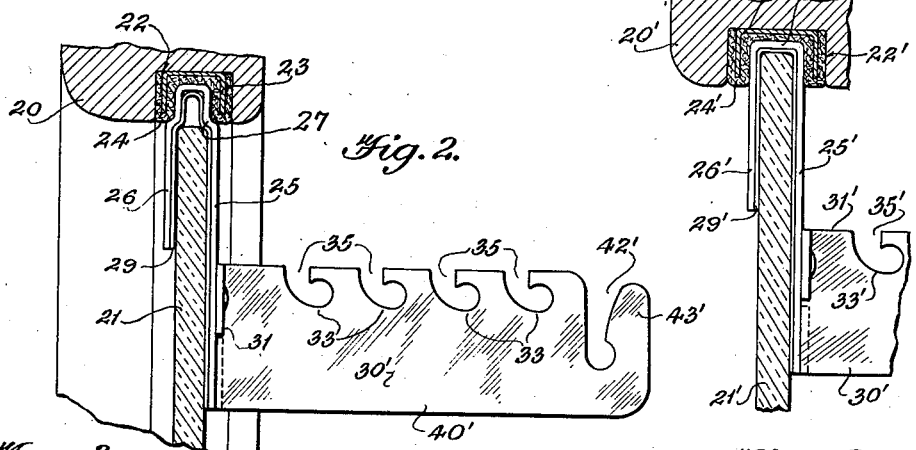
Inventor
Nicholas Zwald,
By Christian R. Nielsen
Attorney Patented Mar. 14, 1944

2,344,339

UNITED STATES PATENT OFFICE 2,344,339

AUTOMOBILE WINDOW SUPPORTED HAT-RACK AND COAT HANGER DEVICE

Nicholas Zwald, Philadelphia, Pa.

Application February 28, 1940, Serial No. 321,341

2 Claims. (Cl. 211—86)

The invention has for an object to provide a device adaptable to be attached to the window glass of automobiles so as to be suspended and held by the top edge thereof with safety, to provide an inwardly projected hat shelf and rack. It is also an aim to present such a device as will serve as a combined hat, coat and towel rack, and which in modifications may be used as a simple coat rack and coat hanger rack having novel functional values for the uses indicated. It is an important aim of the invention to enable the provision of such a rack attachable to the upper edge of an automobile frame glass window light, which will enable the closing of the window without impairment by the device when attached thereto, and will not cause drafts, notwithstanding that it is attachable without the use of suction cups and positive engagement with the edge of the glass.

Another important aim is to provide a device of the character described having novel coat hanger engaging elements, whereby liability of displacement of hangers from position on the device will be minimized. It is an especially important aim of this invention to attain the last named object in a device wherein an arm is arranged to receive a plurality of coat hanger hooks, thereon, the device being adapted to support a number of hats and coat hangers and other articles in proper spaced relation with a minimum liability of dislodgment by the severe jolts to which cars are subjected at times, or in case the car becomes severely tilted in one direction or another.

Another aim of the invention is to present such a device which may be made in considerable size to accommodate a larger number of articles than customary in automobile racks and coat hanger supports, while at the same time being foldable so as to occupy a minimum of space, and permitting it to be stored in door pockets or other small compartments.

It is an important aim of the invention to present a coat hanger support arm which will serve in addition as a coat hook.

Additional objects, advantages and features of invention reside in the construction, arrangement and combination of parts involved in the embodiment of the invention, as will be more readily understood from the following description and accompanying drawing, wherein Figure 1 is a perspective view of a single arm support device, and the edge portions of a ventilating window light engaged therewith.

Figure 2 is an elevational view of the arm showing the manner of its coaction between the window light and window opening frame, whereby lateral stresses of the load on the device will be mainly transmitted to the window frame when the device is in use, and no material stresses transversely to the plane of the glass will be transmitted to the glass at its extreme edge portion.

Figure 2—a is a similar view of a modification of the device.

Figure 3 is a fragmentary elevation of the arm showing the form of the slot and tongue by which the hook elements of a conventional garment hanger are held upon the arm secured against accidental displacement due to vibration of the car or abrupt movements otherwise.

There is illustrated in Figure 1, a portion of a window opening frame 20, which may be a portion of a door as customarily constructed in automobiles, a window light 21 being shown therein, as would customarily be used when vertically slidable in the window opening. For the accommodation of the light, the usual channel 22 is formed in the opening framing in which there is set a channel piece 23 lined with felt 24, which thus fits around the edge portion of the light at each side when the light is closed, including the top edge and the lateral edges of the light.

Engaged upon the glass 21 there is a clasp device 26, made of resilient sheet metal, and including an inner body portion 25 adapted to rest flat against the inner surface of the glass, and an outer portion 26 bent into parallel relation with the part 25, or slightly closer to the inner base portion than the thickness of the glass to be engaged, so that it will clasp an inserted edge portion of glass, as shown in Figures 1 and 2. The junction of the parts 25 and 26 may be slightly reduced, so as to form a shoulder 27, as the device is shown in Figures 1 and 2, but this is not essential, and it may be formed as a simple bight, as at 28 in Figure 2—a, where the device is otherwise the same, corresponding parts being indicated by the same numerals with the application of a prime mark. The surfaces of the clasp which engage the glass may be faced with a non-abrasive or cushion material 29, if desired, which may consist of canton flannel or other fabric customary as facing material for such purposes. On the lower part of the body portion 25 an arm 30 is fixed, which in Figure 1 consists of a blank of sheet metal of substantially rectangular form, longitudinally slit at one end and the opposite portions turned at right angles in opposite directions to form foot flanges or ears 31 secured to the clasp body by riveting or otherwise. The body portion of the blank is continued from these ears in planiform shape to its extremity. It is of sufficient vertical dimension to permit the cutting out of an elongated opening 32 therein, extending for the major portion of its length with rectilinear upper and lower parts, the lower edge, however, having a multiplicity of notches 33, of peculiar form, each including a mouth portion, as shown in Figure 3, at 35 from which the notches are extended downwardly and longitudinally of the arm a distance, as at 36, the end of the notch being in the form of a segment of a circle of considerably more than 180 degrees. This forms an overhanging bill or hook portion 37 over the inner end of the notch, the bill portion 38 being next to the mouth 35 of the notch, and extending downwardly to form the narrow part of the slot. Any desired number of these slots may be formed in the arm, according to the length of the arm, and they are preferably of such dimension that the ordinary hook element of a conventional garment hanger in which the hook 39 is formed of wire, may be rested in the slot, and will pass the bill with small clearance, substantially as shown in Figure 3. This notched lower portion of the arm may be termed a rack bar, while the portion at the upper side of the opening 32 may be termed the top bar. The arm continues a distance outwardly beyond the slotted portion of the bar, and is formed on its vertical end edge with two slots 42, corresponding to the slots 35 first mentioned, but of somewhat greater length, extending further from the edge on which they open, and also a distance in spaced relation to the end edge for a greater distance. Their extremities have circular terminations, as in the first named slot, but at the lower side of the mouth portions of the slot rounded tongues 43 are formed, on which a coat or other garment may be hung directly, without use of a garment hanger, if desired, although the hooks of garment hangers may also be engaged in these slots, as may be readily seen.

If desired, the arm may be modified substantially as shown at 30' in Figure 2, where the upper bar portion 41 is omitted, and a single bar 40' corresponding to the bar 40, is formed, but of shorter length, and having fewer of the notches or slots therein, which, however, are of the same shape and form as those first described in the arm 40. A single slot 42' is formed on the end of this arm, of substantially the same shape as the slot 42 of Figure 1.

In the application of garments to the rack device, these may be hung upon conventional coat hangers, and the hook then introduced through the upper part of the openings 33 or 33', as in Figures 2 and 2—a, and the bight of the hook on the garment hanger then allowed to fall in the end of the slot 35. These slots slope downwardly all the way to the inner part under the overhanging part 37. In case the jostling of the car traveling over rough pavement tends to throw the hook of the garment hanger 39 upwardly toward the entrance of the slot, it will strike the bill proper at 38, and the portion 37 will prevent it from being thrown outwardly in the other direction. In case the car leans abruptly toward the side on which my bracket device is located, the garments suspended will swing against the side of the car and be checked thereby, retaining the hooks of the hangers in place, and in case the car swings toward the opposite side, the garment may swing inwardly on the garment hanger, but the hooks 39 will be checked in the circular ends of the slot 35, as will be readily understood. A coat may be engaged over each of the bar portions 43, if desired, as well as over the portion 43' and 43a. In the latter, the mouth portions of the slot extend outwardly through the end edge of the arms 30a, so that the overlying portion of the metal will prevent garment hanger hooks from being thrown out of the slots, and the extension of the semi-circular ends of the slot so that an overhanging portion is formed immediately thereadjacent will also retain the hook, as will be readily understood.

In putting the devices of Figures 1 to 3 in place, it is simply necessary to lower the window of the car and adjust the clasp or hanger element over the top edge of the glass, as shown in the views, and then to raise the window again until its upper edge engages or abuts the felt in the top groove of the window opening.

I claim:

1. A rack device for the uses described comprising a base having a substantially U-shaped part constructed to receive the edge of a window light therein and having an upper part constructed and adapted to engage in the top groove of a window framing, and a single arm extending normally therefrom presenting a free outer end, said arm being a substantially planiform member stamped from sheet metal having a longitudinally extended slot, the lower edge of said slot having a plurality of hook-retaining slots therein, for reception of garment supporting elements.

2. A rack device for the uses described comprising a base having a substantially U-shaped part constructed to receive the edge of a window light therein and having an upper part constructed and adapted to engage in the top groove of a window framing, and a single arm extended normally therefrom presenting a free outer end, said arm being a substantially planiform member stamped from sheet metal having a longitudinal slot therein, the lower edge of said slot having a plurality of hook-retaining slots therein, the end of the arm having at least one slot therein to receive a garment hook, the lower edge of the last named slot being extended upwardly and outwardly to its mouth and shaped to receive a garment thereon directly.

NICHOLAS ZWALD.